United States Patent [19]

Robinson

[11] Patent Number: 5,277,528
[45] Date of Patent: Jan. 11, 1994

[54] MICRO DEBURRING TOOL

[75] Inventor: James R. Robinson, Plymouth, Mich.

[73] Assignee: E-Z Burr Tool Company, Plymouth, Mich.

[21] Appl. No.: 925,957

[22] Filed: Aug. 5, 1992

[51] Int. Cl.⁵ .............................................. B23B 51/10
[52] U.S. Cl. .................................. 408/201; 76/101.1; 219/69.17; 408/714
[58] Field of Search ............... 408/186, 187, 194, 196, 408/201, 211, 225, 714, 156, 180, 200, 209; 76/101.1, 104.1, DIG.; 219/69.12, 69.17

[56] References Cited

U.S. PATENT DOCUMENTS

| | | | |
|---|---|---|---|
| 2,086,121 | 7/1937 | De bats | 76/104.1 |
| 2,361,683 | 10/1944 | Greenbert | 77/60 |
| 2,571,395 | 10/1951 | Vawter | 408/180 X |
| 2,974,216 | 3/1961 | Inoue | 219/69.12 |
| 3,017,791 | 1/1962 | Fried | 408/180 X |
| 3,035,150 | 5/1962 | Connoy | 219/69.12 |
| 3,765,790 | 10/1973 | Kubicek | 408/141 |
| 4,086,018 | 4/1978 | Robinson | 408/226 |
| 4,147,463 | 4/1979 | Robinson | 408/156 |
| 4,320,998 | 3/1982 | Kubicek | 408/226 |
| 4,333,727 | 6/1982 | Bennett | 408/191 |
| 4,895,482 | 1/1990 | Aurentz | 408/225 |
| 4,995,768 | 2/1991 | Craft | 408/239 |

OTHER PUBLICATIONS

Cogsdill Tool Products, Inc. Catalog (Price List No. 8910) Copyright 1989 Cogsdill Tool Products, Inc.

Primary Examiner—Steven C. Bishop
Attorney, Agent, or Firm—Reising, Ethington, Barnard, Perry & Milton

[57] ABSTRACT

A deburring tool including an elongated arbor having a replaceable unitary cutting tool and an assembly holder adapted to removably receive and mount the arbor. The arbor includes a head portion disposed at one end of the arbor and a slot defining a pair of opposed surfaces disposed in spaced parallel relationship with respect to one another and extending from the head portion to the distal end of the arbor opposite the head portion. The tool includes a replaceable unitary cutting tool which is removably mounted between the opposed surfaces defined by the slot in the arbor.

9 Claims, 2 Drawing Sheets

MICRO DEBURRING TOOL

BACKGROUND OF THE INVENTION

1. Technical Field

This invention relates to deburring tools and is particularly concerned with deburring tools used to deburr apertures having diameters of less than 0.093 inches.

2. Description Of The Prior Art

Deburring tools are generally employed to deburr passages bored through workpieces, such as valve bodies and the like, and to put a chamfer on the edges of the holes in the workpieces at the openings of the passages.

One type of deburring tool known in the prior art includes an arbor having an elongated cylindrical body with a cutting tool recess formed using a grinding tool. The recess in the arbors of the prior art extend a fixed distance in the arbor and form a slot having two closed ends. A unitary cutting tool is mounted in the recess of the arbor via mounting means which may include a pin and an adjustable screw. Examples of deburring tools of this type may be found in U.S. Pat. No. 4,086,018 issued to Robinson et al. on Apr. 25, 1978 and U.S. Pat. No. 4,147,463 issued to Robinson on Apr. 3, 1979.

Another type of prior art deburring tool eliminates the use of an arbor and instead employs a two piece cutting tool which forms a bifurcated body to provide a pair of spaced spring arms having cutting blades formed on one or both of the same arms. An example of such a deburring tool can be found at U.S. Pat. No. 4,320,998 issued to Kubicek on Mar. 23, 1982.

While deburring tools known in the prior art function perfectly well to deburr passages having diameters greater than 0.077 inches, to date, such deburring tools have not been used to deburr passages having diameters less than 0.078 inches. This is because, in the past, it has not been possible to manufacture such a tool which would effectively do the job in a cost efficient manner and which would withstand the rigors of use without premature breakage or failure.

As such, it was necessary to deburr such small passages by hand—a time consuming, monotonous and expensive procedure, especially in this day of high-tech automation. Further, the advance of technology has allowed pilot valves" control valves and many other pneumatic and hydraulic devices to be drastically down-sized creating a great need for a tool which could properly deburr very small passages in a cost efficient, effective manner. Prior to the advent of the subject invention, this need had not been met.

SUMMARY OF THE INVENTION AND ADVANTAGES

The subject invention overcomes the problems in the prior art by providing a microdeburring tool which is capable of deburring passages having diameters of less than 0.078 inches. The deburring tool of the subject invention has an elongated arbor including a replaceable unitary cutting tool and an assembly holder adapted to removably receive and mount the arbor. The arbor includes a head portion disposed at one end of the arbor and a slot defining a pair of opposed surfaces disposed in spaced parallel relationship with respect to one another and extending from the head portion to the distal end of the arbor opposite the head portion. Furthermore, the replaceable unitary cutting tool is removably mounted between the opposed surfaces defined by the slot in the arbor.

The slot in the arbor is formed using a wire electrical discharge machine (EDM) and extends the full remaining length of the arbor from the head portion to its distal end. In this way, small unitary cutting tools, also cut by EDM from a block of M-2 high speed tool steel can be mounted in the slot and held in place by the assembly holder.

Alternatively, the subject invention is directed toward a method of making an arbor for use in a deburring tool assembly of the subject invention for deburring passages in workpieces. The method includes the steps of positioning an elongated cylindrical drill blank which defines a longitudinal axis and which has opposite ends in a fixture such that the drill blank may be cut with a wire EDM. The subject method further includes the step of cutting a slot diametrically through the arbor and perpendicular to the longitudinal axis of the elongated cylindrical arbor and extending from one end of the arbor to a point less than the entire distance of the arbor to form a head portion at one end of the arbor and a pair of opposed flat surfaces disposed in spaced parallel relationship with respect to one another extending from the head portion to the opposite end of the arbor.

Still further, the subject invention is directed toward a method of making a unitary cutting tool for use in a deburring tool assembly for deburring passages in workpieces. This method includes the steps of cutting a block of high speed tool steel so as to form the profile of the cutting tool and passing the wire of the Electrical Discharge Machine through the block in a direction parallel to the profile to form a unitary cutting tool having a head and a blade extending therefrom to define a longitudinal axis of the cutting tool.

DESCRIPTION OF THE DRAWINGS

Other advantages and features of the invention will become apparent from the following description taken in connection with the accompanying drawings in which.

DETAILED DESCRIPTION OF THE BEST MODE OF CARRYING OUT THE INVENTION

Figure 1:
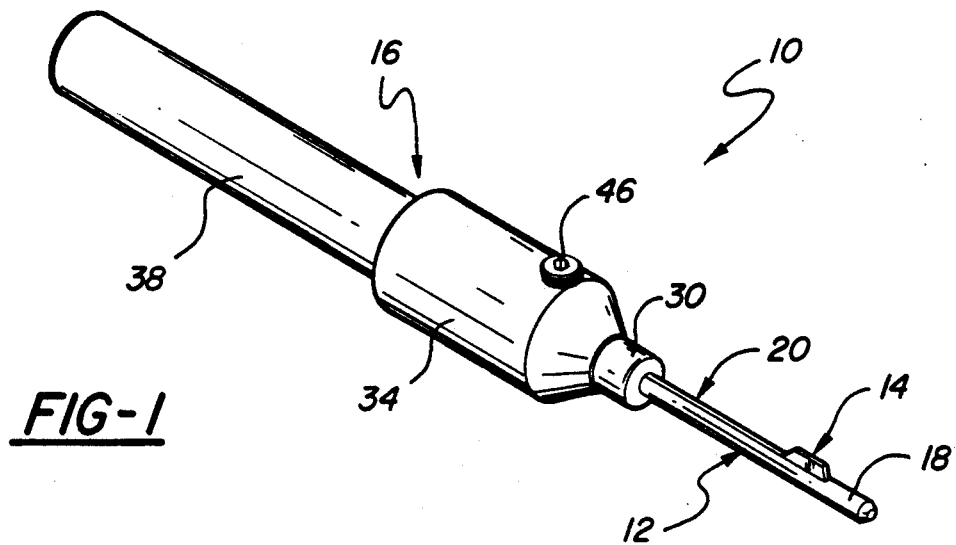
FIG. 1 a perspective view of the deburring tool of the subject invention.

A deburring tool of the subject invention is generally shown at 10 in FIG. 1. The deburring tool 10 includes structure which makes the tool particularly useful for deburring apertures in workpieces having diameters less than 0.078 inches.

The deburring tool 10 includes an elongated cylindrical arbor, generally indicated at 12, in which is supported a replaceable unitary cutting tool, generally indicated at 14. The tool 10 also includes an assembly holder, generally shown at 16, which receives and mounts the arbor 12 as will be discussed in further detail below.

Figure 2:
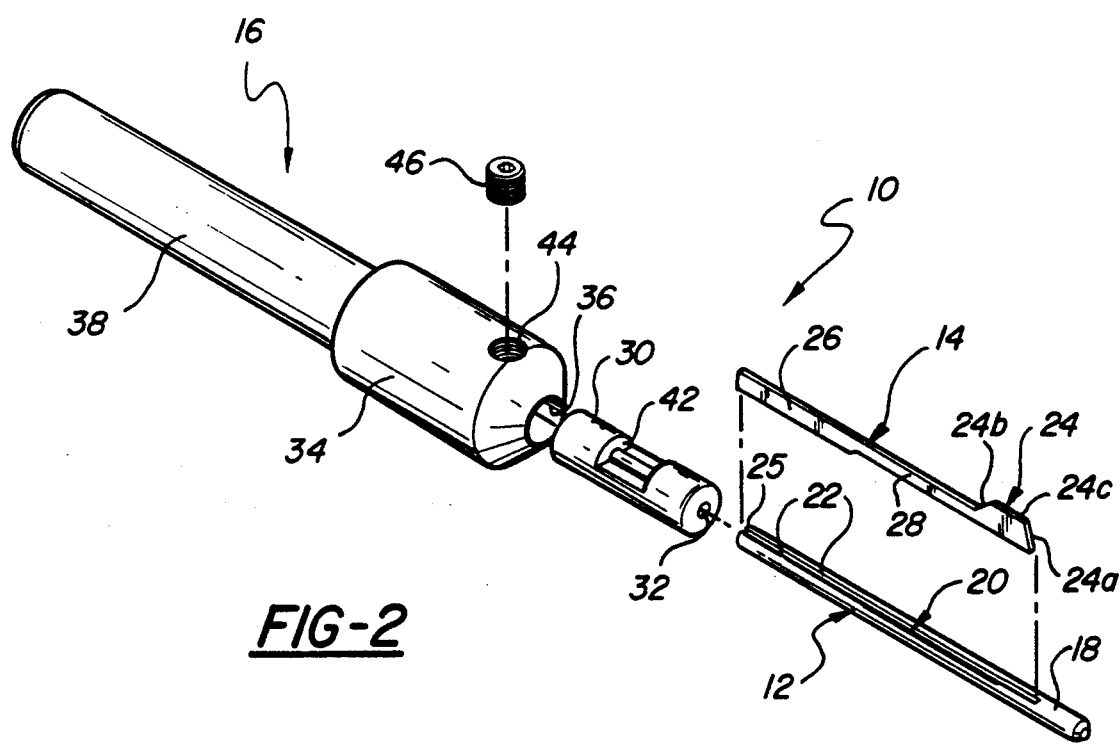
FIG. 2 is an assembly view of the deburring tool in perspective.
Figure 3:
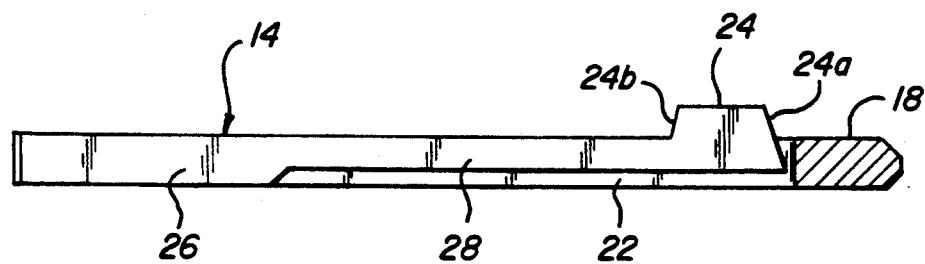
FIG. 3 is a cross-sectional side view of the arbor having a unitary cutting tool mounted within its slot.
Figure 4:
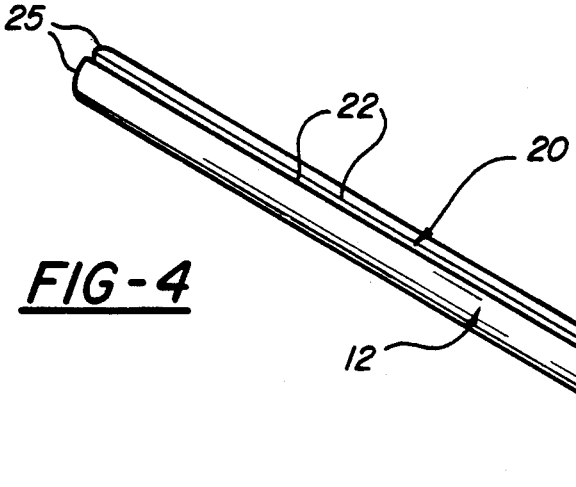
FIG. 4 is a perspective view of the arbor of the subject invention.

Referring now to FIGS. 2–4, the cylindrical arbor 12 has a body defining a longitudinal axis and includes a head portion 18 located at one end of the arbor 12 and a slot, generally indicated at 20, extending diametrically through the arbor 12 transverse to the longitudinal axis and formed by a wire Electrical Discharge Machine (EDM). The width of the slot 20 can range from approximately 0.020 to 0.025 inches. The slot 20 defines a pair of opposed flat surfaces 22. The pair of opposed flat surfaces 22 are disposed in spaced parallel relationship with respect to one another and extend longitudinally from the head portion 18 to the distal end of the arbor opposite the head portion 18.

The slot 20 extends the full remaining distance from the head 18 to the distal opposite end of the arbor 12 to present a split end 25 in the arbor 12. The use of an EDM allows for a very thin slot to be cut in a relatively small arbor having a diameter less than 0.078 inches. Prior to the subject invention, deburring tools having recesses formed using milling or grinding tools could not be economically manufactured to deburr holes having diameters in the range of approximately 0.056 to 0.093 inches.

Figure 5:
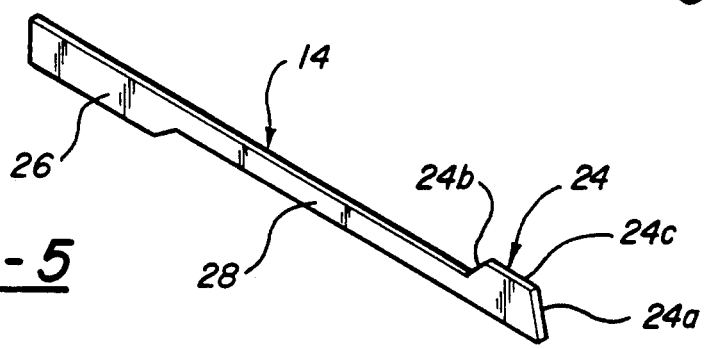
FIG. 5 is a perspective view of the unitary cutting tool of the subject invention.

As shown in FIGS. 2, 3 and 5, the replaceable unitary cutting tool 14 is removably mounted between the opposed flat surfaces 22 defined by the slot 20 and the arbor 12. The cutting tool 14 includes a head, generally indicated at 24 and an elongated flat resilient blade 26 extending therefrom to define a longitudinal axis of the cutting tool 14. The blade 26 of the cutting tool 14 is clamped between the pair of opposed flat surfaces 22 defined by the slot 20 and the arbor 12. The resilient blade 26 includes a portion of reduced height 28 which allows the blade to flex during the deburring process as will be discussed in greater detail below.

As with the arbor, the cutting tool 14 is cut from a block of M-2 high speed tool steel using a wire EDM. In this way, the cutting tool 14 may be made having a very thin transverse thickness or width of approximately 0.020 to 0.025 inches and which is adapted to be received in the slot 20 between the opposed flat surfaces 22.

Referring now to FIG. 2, the assembly holder 16 includes a short, cylindrical collet 30 having a central passage 32 extending longitudinally therethrough and adapted to receive the arbor 12. The assembly holder 16 further includes a mandrel 34 having an open ended mounting hole 36 disposed at one end thereof and adapted to receive the collet 30 such that the deburring tool 10 may be mounted in a drive motor (not shown). The assembly holder 16 also includes a substantially cylindrical shank 38 extending longitudinally rearward from the mandrel 34 and which is adapted to be received by the chuck of a drive motor.

The central passage 32 of the collet 30 holds in position the pair of opposed surfaces 22 to frictionally clamp the cutting tool 14 between the pair of opposed flat surfaces 22 of the arbor 12. The collet 30 includes a recess 42 and the mandrel 34 includes an aperture 44 extending transverse to the open ended mounting hole 36. The recess 42 and the aperture 44 are adapted to receive a threaded screw 46 to fixedly mount the arbor 12 and blade 14 in the collet 30 and within the mounting hole 36 of the mandrel 34.

Figure 6:
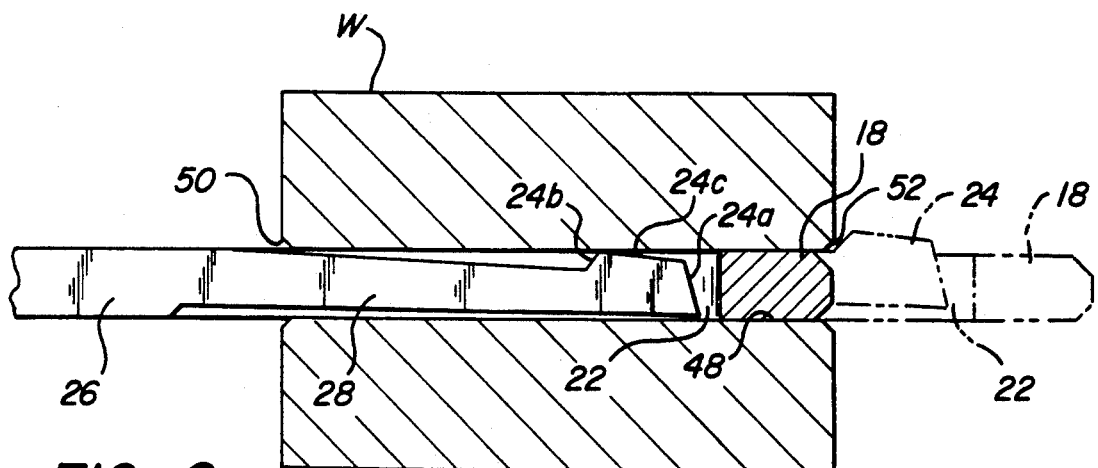
FIG. 6 is a sectional view of the arbor and cutting tool of the subject invention disposed within a workpiece with the cutting head of the deburring tool shown in an intermediate position within the hole of the workpiece in full lines and in the reverse deburring position in phantom lines.

Referring to FIGS. 1, 3 and 6, the cutting head 24 is supported by the blade 26 in an operable position in which it projects from the slot 20 in the unstressed condition of the blade 26 shown in FIGS. 1 and 3. However, the portion having a reduced height 28 is resiliently yieldable so that the cutting head 24 can move inwardly with respect to the slot 20 as illustrated in FIG. 6.

The cutting head 24 includes a top, non-cutting surface 24c with a leading cutting edge 24a and a trailing cutting edge 24b extending angularly from the opposite ends of the top edge 24c.

FIG. 6 illustrates a workpiece W in cross-section formed with a hole 48. The hole 48 may be formed by drilling or some other operation. The hole 48 has a leading edge 50 and a trailing edge 52.

At the beginning of the deburring operation, the assembly holder 16 mounted in a rotating chuck or tool holder, is rotated and advanced toward the right, as viewed in FIG. 6, with the leading cutting edge 24a engaging the leading cutting edge 50 of the hole 48 to remove burrs and form a slight chamfer as indicated by reference numeral 50 in FIG. 6.

The arbor first engages the end 50 of the hole 48 and advances to the right to the phantom line position illustrated in FIG. 6. The top, non-cutting edge 24c resiliently engages the wall of the hole 48 as the blade moves toward the right through the hole 48.

When the cutting head 24 clears the trailing end of the hole 48 at 52, as indicated in phantom lines in FIG. 6, the direction of the movement of the tool is reversed and the trailing cutting edge 24b removes burrs and slightly chamfers the trailing end of the hole 48 of the workpiece W.

As the blade is withdrawn toward the left in FIG. 6, the engagement of the trailing edge 24b with the end 52 of the hole 48 causes the blade 26 to yield and permit the cutting head 24 to assume the full line position shown in FIG. 6 as the tool is withdrawn toward the left from the hole 48 of the workpiece W. The amount of pressure applied by the cutting edges 24a and 24b is determined by the resiliency of the portion of reduced height 28 of the blade 26 in the unstressed position of the cutting head 24.

The collet 30, arbor 12, and cutting tool 14 may be removed and replaced simply by removing the threaded screw 46.

The method of making the arbor 12 of the subject invention used in the deburring tool assembly 10 disclosed herein for deburring passages in workpieces includes the following steps. An elongated cylindrical drill blank defining a longitudinal axis and having opposite ends is positioned in a fixture such that the drill blank may be cut with a wire EDM. A slot 20 is cut diametrically through the arbor 12 perpendicular to its longitudinal axis and extends from one end of the arbor 12 to a point less than the entire distance of the arbor 12 to form a head portion 18 of the arbor 12 and a pair of opposed flat surf aces 22 disposed in spaced parallel relationship with respect to one another. The slot 20 extends from the head portion to the opposite end of the arbor 12 to form the split end 25.

The method of making the unitary cutting tool 14 used in the deburring tool assembly 10 of the subject invention for deburring passages in workpieces includes the following steps. A block of M-2 high speed tool steel is cut so as to form the profile of the cutting tool 14 as shown for example in FIGS. 3 and 6. The wire of an EDM is passed through this block in a direction parallel to the profile to form the unitary cutting tool having a head 24 and blade 26 extending therefrom to define the longitudinal axis of the cutting tool. The cutting tool 14, cut from the block has a width of between 0.020 and 0.025 inches. In this way, a series of cutting tools 14 may be "sliced" from the profiled block of tool steel using the wire EDM.

While a specific form of the invention is described in the foregoing specification and illustrated in the accompanying drawings, the invention is not limited to the exact instructions shown. To the contrary, alterations in the construction and arrangement of parts, all falling within the scope and spirit of the invention, will be apparent to those skilled in the art.

What is claimed is:

1. A deburring tool comprising;
    an elongated arbor defining a longitudinal axis and including a replaceable unitary cutting tool and an assembly holder adapted to removably receive and mount said arbor;
    said arbor including a head portion disposed at one end of said arbor and a slot extending diametrically through said arbor perpendicular to a plane containing said longitudinal axis and defining a pair of opposed surfaces disposed in spaced parallel relationship with respect to one another, said slot being open ended, extending from said head portion through the distal end of said arbor opposite said head portion;
    said replaceable unitary cutting tool removably mounted between said opposed surfaces defined by said slot in said arbor.

2. A deburring tool for deburring passages in work pieces having a diameter less than 0.078 inches, said tool comprising;
    an elongated arbor defining a longitudinal axis and including a replaceable unitary cutting tool and an assembly holder adapted to removably receive and mount said arbor;
    said arbor including a head portion disposed at one end of said arbor and a slot extending diametrically through said arbor perpendicular to a plane containing said longitudinal axis, said slot formed by an electrical discharge machine defining a pair of opposed surfaces disposed in spaced parallel relationship with respect to one another, said slot being open ended, extending from said head portion through the distal end of said arbor opposite said head portion;
    said replaceable unitary cutting tool removably mounted between said opposed surfaces defined by said slot in said arbor.

3. A deburring tool as set forth in claims 1 or 2 further characterized by said assembly holder including a cylindrical collet having a central passage extending longitudinally therethrough and adapted to receive said arbor and a mandrel having an open ended mounting hole disposed at one end thereof and adapted to receive said collet such that said deburring tool may be mounted in a drive motor.

4. A deburring tool as set forth in claim 3 further characterized by said cutting tool including a cutting head and an elongated flat resilient blade extending therefrom and clamped between said pair of opposed flat surfaces defined by said slot in said arbor, said slot having a width of substantially 0.020 inches.

5. A deburring tool as set forth in claim 4 further characterized by said central passage of said collet holding said pair of opposed surfaces in position so as to frictionally clamp said cutting tool between a pair of opposed surfaces of said arbor.

6. A deburring tool as set forth in claim 5 further characterized by said collet including a recess and said mandrel including an aperture extending transverse to said open ended mounting hole, said recess and said aperture adapted to receive a threaded screw to fixedly mount said collet, arbor and blade within said mounting hole of said mandrel.

7. An arbor for use in a deburring tool assembly for deburring passages in workpieces, said arbor comprising;
    an elongated cylindrical body defining a longitudinal axis and including a head portion disposed at one end of said arbor and a slot extending diametrically through said arbor perpendicular to a plane containing said longitudinal axis of said arbor and defining a pair of opposed flat surfaces disposed in spaced parallel relationship with respect to one another, said slot being open ended, extending longitudinally along said arbor from said head portion through the distal end of said arbor opposite said head portion.

8. An arbor as set forth in claim 7 further characterized by said slot in said arbor formed by a wire Electrical Discharge Machine.

9. A method of making an arbor for use in a deburring tool assembly for deburring passages in workpieces, said method including the steps of;
    positioning an elongated cylindrical drill blank defining a longitudinal axis and having opposite ends in a fixture such that the drill blank may be cut with a wire Electrical Discharge Machine;
    cutting a slot diametrically through said arbor perpendicular to a plane containing said longitudinal axis of said elongated cylindrical arbor and extending from one end of said arbor to a point less than the entire distance of the arbor to form a head portion at one end of said arbor and a pair of opposed flat surfaces disposed in spaced parallel relationship with respect to one another extending from said head portion to the opposite end of said arbor.

* * * * *